United States Patent
Ito

(10) Patent No.: US 11,741,920 B2
(45) Date of Patent: *Aug. 29, 2023

(54) VEHICLE DISPLAY SYSTEM AND VEHICLE DISPLAY METHOD

(71) Applicant: TOYOTA JIDOSHA KABUSHIKI KAISHA, Toyota (JP)

(72) Inventor: Hironori Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,835

(22) Filed: Oct. 4, 2022

(65) Prior Publication Data

US 2023/0026164 A1 Jan. 26, 2023

Related U.S. Application Data

(63) Continuation of application No. 17/491,810, filed on Oct. 1, 2021, now Pat. No. 11,495,193.

(30) Foreign Application Priority Data

Oct. 8, 2020 (JP) .................................. 2020-170513

(51) Int. Cl.
*G09G 5/377* (2006.01)
*G06K 9/00* (2022.01)
(Continued)

(52) U.S. Cl.
CPC ............. *G09G 5/377* (2013.01); *B60K 35/00* (2013.01); *G06V 20/56* (2022.01);
(Continued)

(58) Field of Classification Search
CPC .... G09G 5/377; G09G 2380/10; G06V 20/56; B60K 35/00; B60K 2370/167; B60K 2370/152
See application file for complete search history.

(56) References Cited

U.S. PATENT DOCUMENTS 11,495,193 B2 * 11/2022 Ito ........................... G09G 5/377
2005/0071082 A1 3/2005 Ohmura et al.
(Continued)

FOREIGN PATENT DOCUMENTS

JP 2006-040009 A 2/2006
JP 2017-102739 A 6/2017
(Continued)

OTHER PUBLICATIONS

Hironori Ito, U.S. Appl. No. 17/491,810, Notice of Allowance dated Jul. 12, 2022.

*Primary Examiner* — Lixi C Simpson
(74) *Attorney, Agent, or Firm* — Dickinson Wright, PLLC

(57) ABSTRACT

A vehicle display system includes a vehicle detection device detecting at least one other vehicle present in surroundings of a host vehicle, a vehicle speed detection device detecting a speed of the host vehicle, a display device displaying the host vehicle and the at least one other vehicle respectively as vehicle icons, and a display control part configured to control a content of display of the display device. When the speed of the host vehicle is equal to or less than a predetermined value, the display control part is configured to blank out the display of or display transparently at least a part of a vehicle icon of a following vehicle detected by the vehicle detection device and positioned at a rear of the host vehicle in a driving lane of the host vehicle.

8 Claims, 5 Drawing Sheets

(51) Int. Cl.
  *B60K 35/00* (2006.01)
  *G06V 20/56* (2022.01)
(52) U.S. Cl.
  CPC .. *B60K 2370/152* (2019.05); *B60K 2370/167* (2019.05); *G09G 2380/10* (2013.01)

(56) References Cited

U.S. PATENT DOCUMENTS

| | | |
|---|---|---|
| 2018/0105040 A1 | 4/2018 | Ryu et al. |
| 2018/0194363 A1 | 7/2018 | Sugiura et al. |
| 2019/0094040 A1 | 3/2019 | Lewis et al. |
| 2020/0247319 A1* | 8/2020 | Shimizu ................ B60R 1/00 |
| 2021/0094473 A1* | 4/2021 | Gali ...................... H04N 23/54 |
| 2022/0161657 A1 | 5/2022 | Seitz et al. |

FOREIGN PATENT DOCUMENTS

| | | |
|---|---|---|
| JP | 2017187982 A | 10/2017 |
| JP | 2019-087909 A | 6/2019 |
| WO | 2020/111036 A1 | 6/2006 |

* cited by examiner

FIG. 3
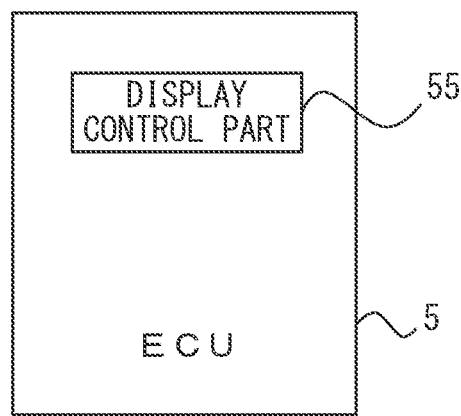
FIG. 4
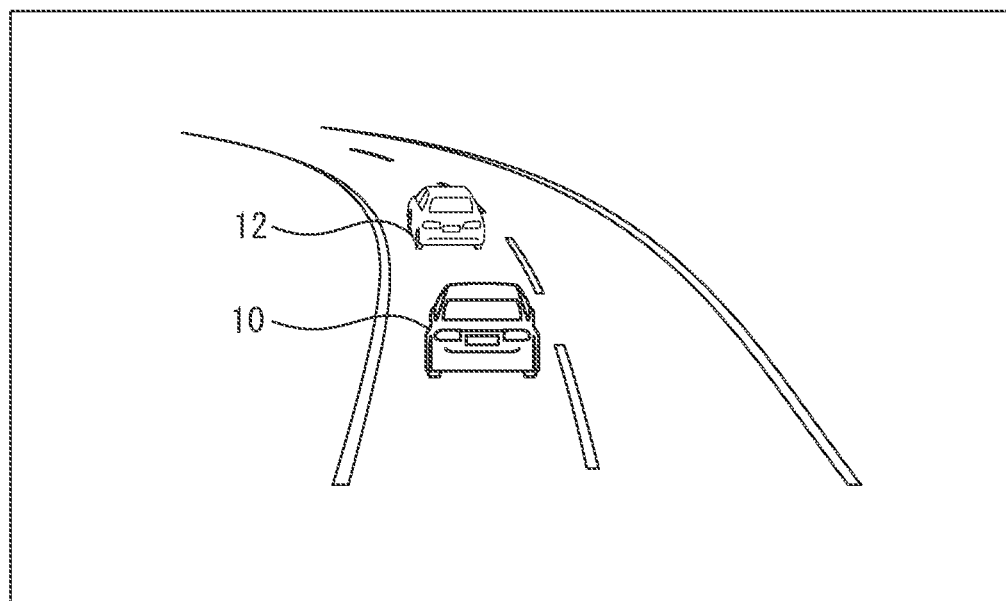

VEHICLE DISPLAY SYSTEM AND VEHICLE DISPLAY METHOD

RELATED APPLICATION

This application is a continuation of U.S. patent application Ser. No. 17/491,810, filed Oct. 1, 2021, which claims priority to Japanese Patent Application No. 2020-170513, filed on Oct. 8, 2020, including the specification, drawings and abstract, the entire disclosure of which is incorporated herein by reference.

FIELD

The present disclosure relates to a vehicle display system and a vehicle display method.

It has been known in the past to display other vehicles etc., detected by a vehicle detection device mounted in the vehicle on a display device in the vehicle, in order to give information to a driver of the vehicle about the surroundings (for example, PTL 1).

CITATIONS LIST

Patent Literature

[PTL 1] Japanese Unexamined Patent Publication No. 2017-187982

SUMMARY

Technical Problem

In such a display device, in order to facilitate monitoring of not only the front region of a vehicle, but also the rear of a vehicle, it has been studied to display other vehicles in the surroundings including the following vehicle on a display device together with a host vehicle.

However, usually, when the speed of the host vehicle is low, compared to when the speed of the host vehicle is high, distances between the host vehicle and the other vehicles in the front and back become shorter. As a result, the following vehicle is superposed over the host vehicle on the display device and the visual recognition ability of the host vehicle is liable to fall.

In consideration of the above problem, an object of the present disclosure is to keep the visual recognition ability of a host vehicle from falling on a display device due to a following vehicle.

Solution to Problem

The summary of the present disclosure is as follows.

(1) A vehicle display system comprising: a vehicle detection device detecting at least one other vehicle present in surroundings of a host vehicle; a vehicle speed detection device detecting a speed of the host vehicle; a display device displaying the host vehicle and the at least one other vehicle respectively as vehicle icons; and a display control part configured to control a content of display of the display device, wherein when the speed of the host vehicle is equal to or less than a predetermined value, the display control part is configured to blank out the display of or display transparently at least a part of a vehicle icon of a following vehicle detected by the vehicle detection device and positioned at a rear of the host vehicle in a driving lane of the host vehicle.

(2) The vehicle display system described in above (1), wherein when the speed of the host vehicle is equal to or less than the predetermined value, the display control part is configured to blank out the display of or display transparently at least a part of the vehicle icon of the following vehicle only when the vehicle icon of the following vehicle is superposed over the vehicle icon of the host vehicle.

(3) A vehicle display method for displaying a host vehicle and at least one other vehicle present in surroundings of the host vehicle respectively as vehicle icons on a display device, including: detecting the at least one other vehicle by a vehicle detection device; detecting a speed of the host vehicle by a vehicle speed detection device; and when the speed of the host vehicle is equal to or less than a predetermined value, blanking out the display of or displaying transparently at least a part of a vehicle icon of a following vehicle detected by the vehicle detection device and positioned at a rear of the host vehicle in a driving lane of the host vehicle.

Advantageous Effects of Invention

According to the present disclosure, it is possible to keep the visual recognition ability of a host vehicle from falling on a display device due to a following vehicle.

BRIEF DESCRIPTION OF DRAWINGS

FIG. 3 is a functional block diagram of an ECU of FIG. 2.

FIG. 4 is a view showing one example of an image displayed on a display device.

DESCRIPTION OF EMBODIMENTS

Figure 1:
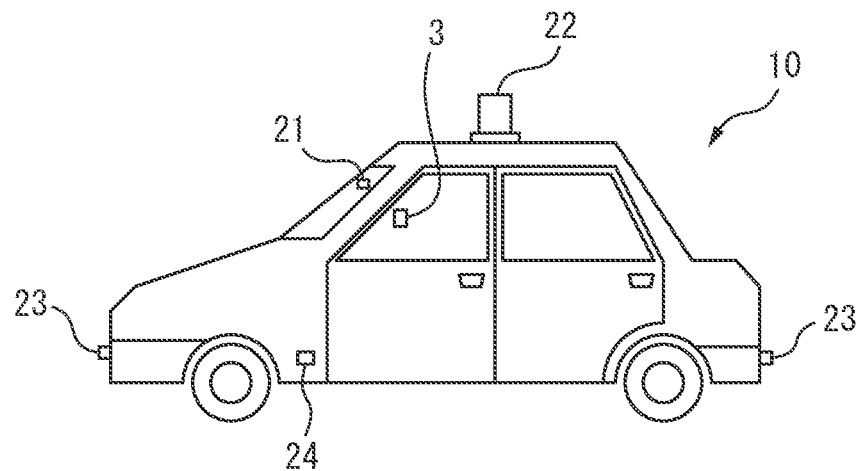
FIG. 1 is a view schematically showing a part of a configuration of a vehicle in which a vehicle display system according to a first embodiment of the present disclosure is mounted.

Below, referring to the drawings, embodiments of the present disclosure will be explained in detail. Note that, in the following explanation, similar component elements are assigned the same reference notations.

First Embodiment

First, referring to FIG. 1 to FIG. 6, a first embodiment of the present disclosure will be explained.

<Explanation of Vehicle as a Whole>

FIG. 1 is a view schematically showing a part of the configuration of a vehicle 10 in which a vehicle display system according to the first embodiment of the present disclosure is mounted. The vehicle 10 can perform automated driving in which a part or all of the acceleration, steering, and braking are automatically performed. That is, the vehicle 10 is a so-called autonomous driving vehicle.

As shown in FIG. 1, the vehicle 10 is provided with a camera 21, a LIDAR (laser imaging detection and ranging) 22, a milliwave radar 23, an ultrasonic sensor (sonar) 24, and a display device 3.

The camera 21 captures the surroundings of the vehicle 10 and generates images of the surroundings of the vehicle 10. In the present embodiment, the camera 21 is arranged at the front of the vehicle 10 (for example, the back surface of the room mirror inside the vehicle, the front bumper, etc.) so as to capture the front region of the vehicle 10. Note that the camera 21 may be a stereo camera able to measure distance.

The LIDAR 22 emits laser beams to the surroundings of the vehicle 10 and receives reflections of the laser beams. Due to this, the LIDAR 22 can detect the presence of any object in the surroundings of the vehicle 10, the distance from the vehicle 10 to the object, and the relative speed of the vehicle 10 and the object. In the present embodiment, the LIDAR 22 is provided at the top part of the vehicle 10, specifically on the roof of the vehicle 10.

The milliwave radar 23 emits milliwaves to the surroundings of the vehicle 10 and receives reflections of the milliwaves. Due to this, the milliwave radar 23 can detect the presence of any object in the surroundings of the vehicle 10, the distance from the vehicle 10 to the object, and the relative speed of the vehicle 10 and the object. In the present embodiment, milliwave devices 23 are provided at the front part and the rear part of the vehicle (for example, the front bumper and the rear bumper of the vehicle 10).

The ultrasonic sensor 24 emits ultrasonic waves to the surroundings of the vehicle 10 and receives reflections of the ultrasonic waves. Due to this, the ultrasonic sensor 24 can detect the presence of any object in the surroundings of the vehicle 10, the distance from the vehicle 10 to the object, and the relative speed of the vehicle 10 and the object. In the present embodiment, ultrasonic sensors 24 are provided at the both side parts of the vehicle (for example, the left and right front bumpers of the vehicle 10).

Note that the positions and numbers of the camera 21, the LIDAR 22, the milliwave radar 23, and the ultrasonic sensor 24 are not limited to the above. Further, some of these may be omitted.

The display device 3 has a display for displaying text, images, and other digital information and displays various information to the driver of the vehicle 10. The display device 3 is provided at the inside of the vehicle so as to be able to be seen by the driver of the vehicle 10. The display device 3 is a human-machine interface (HMI) comprised of at least one of, for example, a touch screen, a heads up display, a digital instrumentation panel, etc. Note that, the display device 3 may be provided with a speaker for generating voice and other audio, operating buttons for a driver to perform input operations, a microphone receiving voice information from the driver, etc.

<Vehicle Display System>

Figure 2:
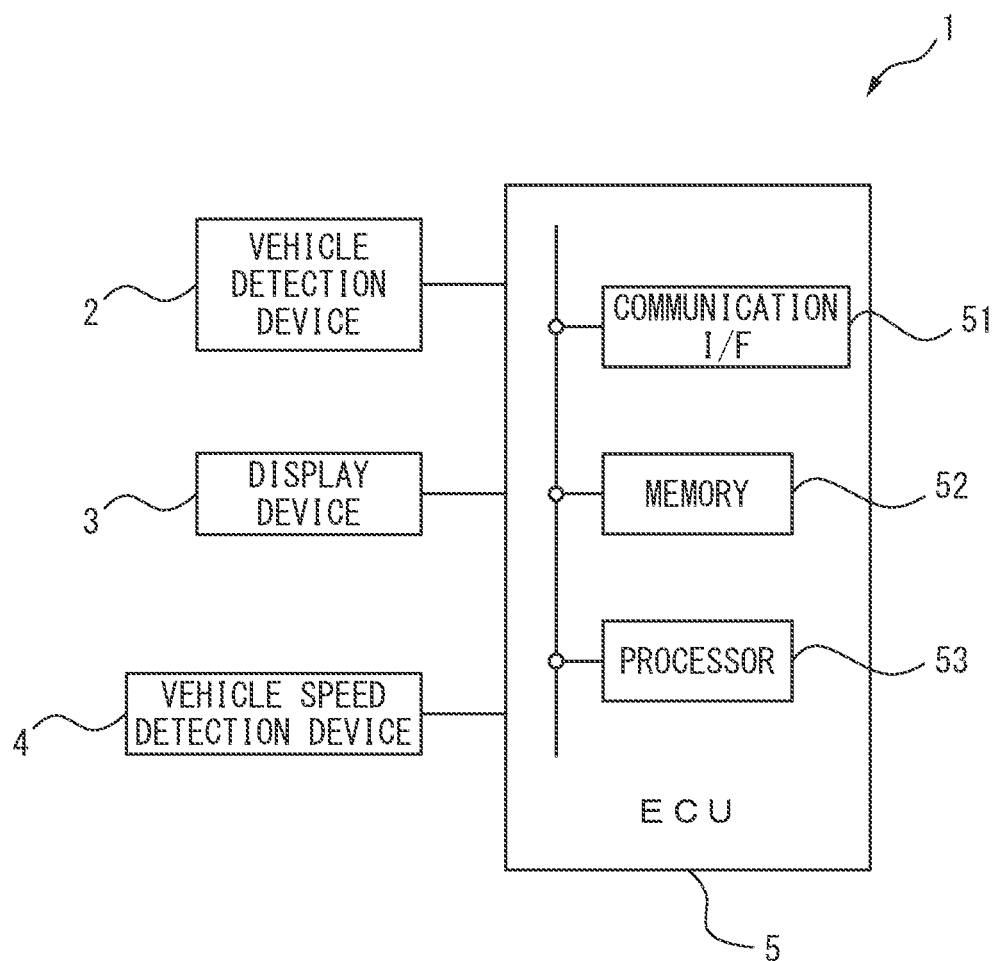
FIG. 2 is a view schematically showing the configuration of the vehicle display system according to the first embodiment of the present disclosure.

FIG. 2 is a view schematically showing the configuration of the vehicle display system 1 according to the first embodiment of the present disclosure. The vehicle display system 1 displays information on other vehicles in the surroundings of the vehicle 10 to the driver.

As shown in FIG. 2, the vehicle display system 1 is provided with a vehicle detection device 2, a display device 3, a vehicle speed detection device 4, and an electronic control unit (ECU) 5. The vehicle detection device 2, the vehicle speed detection device 4, the display device 3, and the ECU 5 are provided at the vehicle 10. The vehicle detection device 2, the vehicle speed detection device 4, and the display device 3 are connected through an internal vehicle network based on the CAN (Controller Area Network) or other standard to be able to communicate with the ECU 5.

The vehicle detection device 2 detects other vehicles present in the surroundings of the vehicle 10 (host vehicle). In the present embodiment, at least some of the camera 21, the LIDAR 22, the milliwave radar 23, and the ultrasonic sensor 24 function as the vehicle detection devices 2. That is, the camera 21, the LIDAR 22, the milliwave radar 23, and the ultrasonic sensor 24 are examples of vehicle detection devices 2. The outputs of the vehicle detection devices 2 are sent to the ECU 5.

The display device 3 displays other vehicles detected by the vehicle detection device 2. The ECU 5 sends commands relating to display of other vehicles to the display device 3.

The vehicle speed detection device 4 detects the speed of the vehicle 10. The vehicle speed detection device 4 for example detects the rotational speed of the wheels of the vehicle 10 to thereby detect the speed of the vehicle 10. The output of the vehicle speed detection device 4 is sent to the ECU 5.

The ECU 5 performs various controls of the vehicle 10. As shown in FIG. 2, the ECU 5 is provided with a communication interface 51, a memory 52, and a processor 53. The communication interface 51 and the memory 52 are connected to the processor 53 through signal lines. Note that, in the present embodiment, a single ECU 5 is provided, but a plurality of ECUs may be provided for the respective functions.

The communication interface 51 has an interface circuit for connecting the ECU 5 to an internal vehicle network based on the CAN or other standard. The ECU 5 communicates with other vehicle-mounted devices such as the vehicle detection device 2, the display device 3, and the vehicle speed detection device 4 through the communication interface 51.

The memory 52, for example, has a volatile semiconductor memory and a nonvolatile semiconductor memory. The memory 52 stores programs, data, etc., used when various types of processing are performed by the processor 53.

The processor 53 has one or more CPUs (central processing units) and their peripheral circuits. Note that, the processor 53 may further have a processing circuit such as a logic processing unit or a numerical processing unit.

FIG. 3 is a functional block diagram of the ECU 5 of FIG. 2. In the present embodiment, the ECU 5 has a display control part 55. The display control part 55 is a functional module realized by a program stored in the memory 52 of the ECU 5 run by the processor 53 of the ECU 5. The display control part 55 controls the display content of the display device 3.

In the present embodiment, the display device 3 displays the vehicle 10 and other vehicles in the surroundings of the vehicle 10 respectively as vehicle icons. The sizes and shapes of the vehicle icons are determined in advance. FIG. 4 is a view showing one example of an image displayed on the display device 3. As shown in FIG. 4, the display device 3 displays an image when viewing the surroundings of the vehicle 10 from a position higher than the vehicle 10 at the rear region of the vehicle 10. The driver of the vehicle 10 can view this display to thereby obtain a grasp of the detected states of other vehicles 12 in the surroundings of the vehicle 10.

Figure 5:
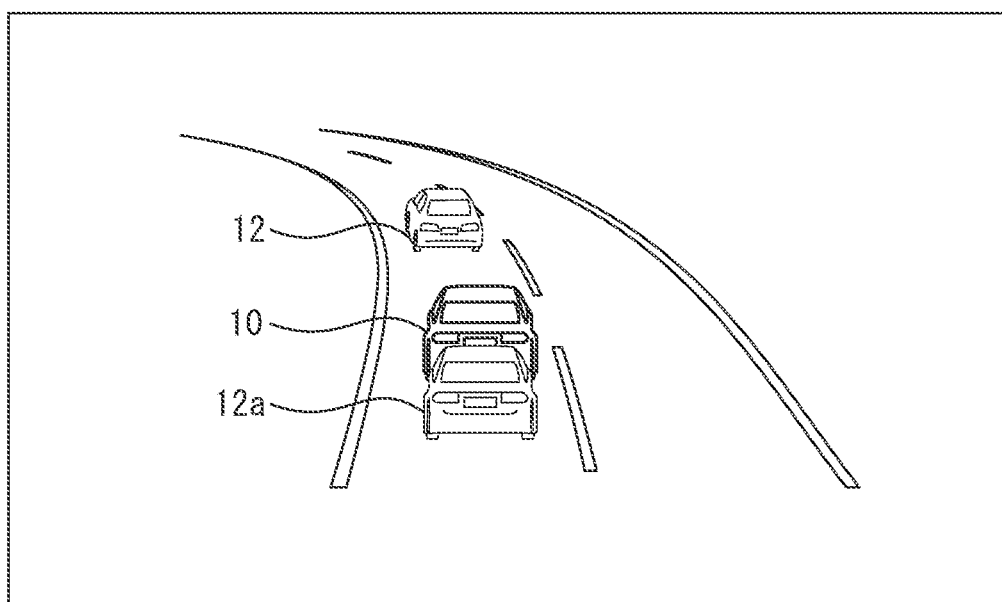
FIG. 5 is a view showing one example of an image with a following vehicle displayed superposed over a host vehicle.

However, usually, when the speed of the vehicle 10 is low, compared to when the speed of the vehicle 10 is high, distances between the vehicle 10 and the other vehicles in the front and back become shorter. As a result, the following vehicle is superposed over the vehicle 10 on the display device 3 and the visual recognition ability of the vehicle 10 (host vehicle) is liable to fall. FIG. 5 is a view showing one example of an image where the following vehicle is superposed over the host vehicle. In this case, the visual recognition ability of the vehicle 10 falls and it becomes difficult for the positional relationships between the vehicle 10 and other vehicles 12 in the surroundings to be instantaneously grasped by the driver.

For this reason, in the present embodiment, when the speed of the vehicle 10 detected by the vehicle speed detection device 4 is equal to or less than a predetermined value, the display control part 55 blanks out the display of the vehicle icon of the following vehicle 12a detected by the vehicle detection device 2 and positioned at the rear of the vehicle 10 in the driving lane of the vehicle 10. That is, even in the detected state of the other vehicles shown in FIG. 5, the image shown in FIG. 4 is displayed on the display device 3. By doing this, it is possible to keep the following vehicle 12a from being superposed over the vehicle 10 on the display device 3 and in turn the visual recognition ability of the vehicle 10 can be kept from falling.

<Vehicle Display Processing>

Figure 6:
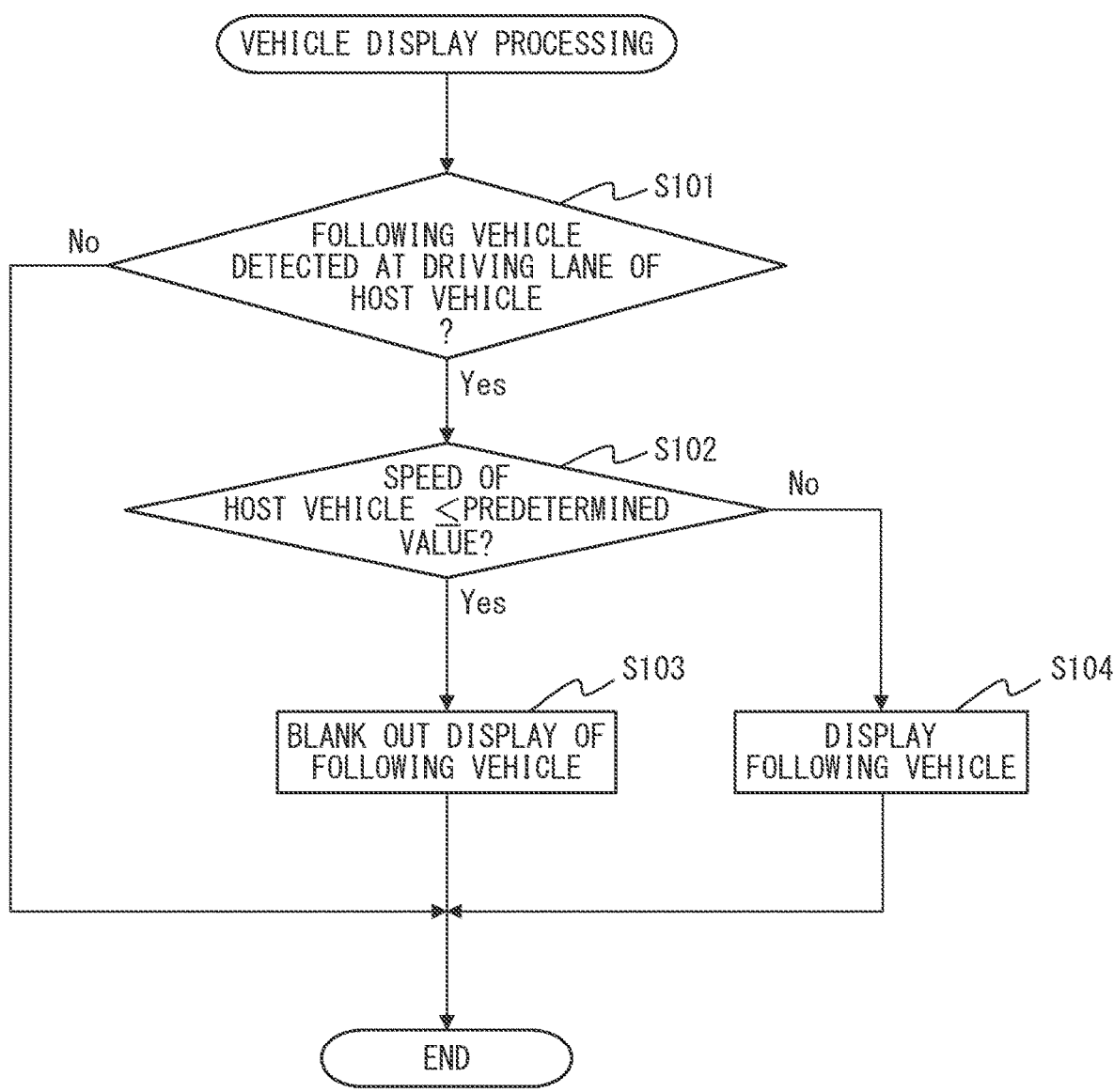
FIG. 6 is a flow chart showing a control routine of vehicle display processing in the first embodiment.

Below, referring to the flow chart of FIG. 6, the above-mentioned control will be explained in detail. FIG. 6 is a flow chart showing a control routine of vehicle display processing in the first embodiment. The present control routine is repeatedly performed by the ECU 5 at predetermined execution intervals. The predetermined execution intervals are, for example, intervals at which other vehicles are detected by the vehicle detection device 2.

First, at step S101, the display control part 55 judges whether a following vehicle positioned at the rear of the host vehicle (vehicle 10) in the driving lane of the host vehicle has been detected based on the results of detection of other vehicles by the vehicle detection device 2. If it is judged that no following vehicle has been detected, the present control routine is ended. On the other hand, if it is judged that a following vehicle has been detected, the present control routine proceeds to step S102.

At step S102, the display control part 55 judges whether the speed of the host vehicle detected by the vehicle speed detection device 4 is equal to or less than a predetermined value. The predetermined value is set in advance. For example, it is set to 20 km/h to 60 km/h.

If at step S102 it is judged that the speed of the host vehicle is equal to or less than the predetermined value, the present control routine proceeds to step S103. At step S103, the display control part 55 blanks out the display of the vehicle icon of the following vehicle. After step S103, the present control routine is ended.

On the other hand, if at step S102 it is judged that the speed of the host vehicle is higher than the predetermined value, the present control routine proceeds to step S104. At step S104, the display control part 55 displays the vehicle icon of the following vehicle on the display device 3. After step S104, the present control routine is ended.

Note that, at step S103, the display control part 55 may display the vehicle icon of the following vehicle transparently. In this case, the color of the vehicle icon of the following vehicle is made a clear one, and even if the vehicle icon of the following vehicle has become superposed over the vehicle icon of the host vehicle, the vehicle icon of the host vehicle can be seen through the vehicle icon of the following vehicle.

Further, at step S103, the display control part 55 may blank out the display of or may transparently display a part of the vehicle icon of the following vehicle. In this case, for example, the display control part 55 blanks out the display of or transparently displays the front half or the top half of the vehicle icon of the following vehicle.

Therefore, in the first embodiment, when the speed of the host vehicle detected by the vehicle speed detection device 4 is equal to or less than a predetermined value, the display control part 55 blanks out the display of or transparently displays at least a part of the vehicle icon of the following vehicle detected by the vehicle detection device 2 and positioned at the rear of the host vehicle in the driving lane of the host vehicle.

Second Embodiment

The vehicle display system according to the second embodiment is basically the same as the vehicle display system according to the first embodiment in configuration and control except for the points explained below. For this reason, the second embodiment of the present disclosure will be explained focusing on the parts different from the first embodiment.

As explained above, usually, when the speed of the vehicle 10 is low, compared with when the speed of the vehicle 10 is high, distances between the vehicle 10 and the other vehicles in the front and back become shorter. However, even when the speed of the vehicle 10 is low, the vehicle icon of the following vehicle is not always superposed over the vehicle icon of the vehicle 10 on the display device 3. When the vehicle icon of the following vehicle is not superposed over the vehicle icon of the vehicle 10, it is preferable to display the following vehicle detected by the vehicle detection device 2 on the display device 3 so as to make the driver recognize the detected state of the following vehicle.

For this reason, in the second embodiment, when the speed of the vehicle 10 detected by the vehicle speed detection device 4 is equal to or less than a predetermined value, the display control part 55 blanks out the display of or displays transparently at least a part of the vehicle icon of the following vehicle only when the vehicle icon of the following vehicle is superposed over the vehicle icon of the host vehicle on the display device 3. By doing this, it is possible to keep the visual recognition ability of the following vehicle on the display device 3 from falling while keeping the visual recognition ability of the host vehicle from falling.

<Vehicle Display Processing>

Figure 7:
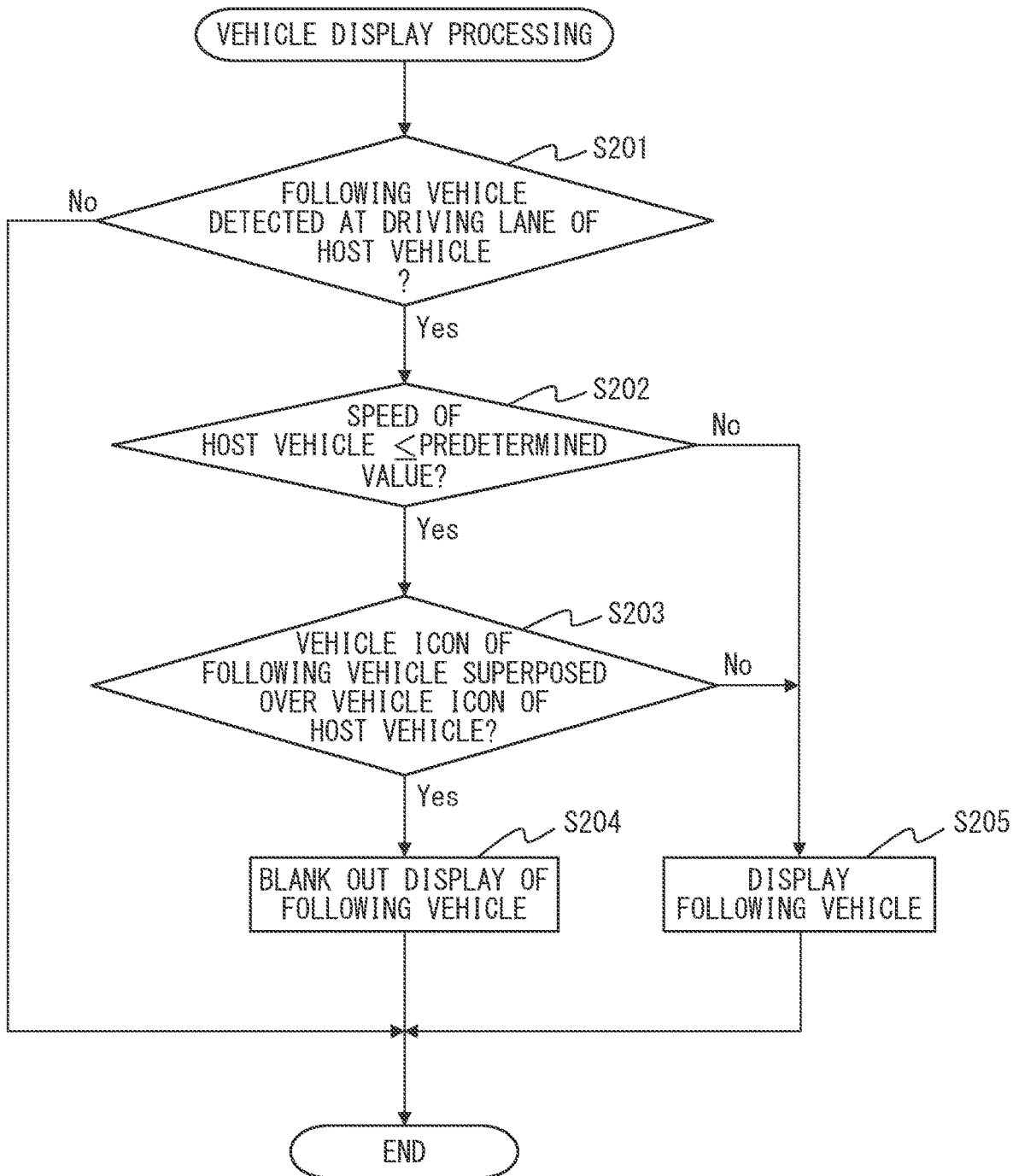
FIG. 7 is a flow chart showing a control routine of vehicle display processing in a second embodiment.

FIG. 7 is a flow chart showing a control routine of vehicle display processing in the second embodiment. The present control routine is repeatedly performed by the ECU 5 at predetermined execution intervals. The predetermined execution intervals are, for example, intervals at which other vehicles are detected by the vehicle detection device 2.

Step S201 and S202 are performed in the same way as step S101 and S102 of FIG. 6. If at step S202 it is judged that the speed of the host vehicle is equal to or less than a predetermined value, the present control routine proceeds to step S203.

At step S203, the display control part 55 judges whether the vehicle icon of the following vehicle is superposed over the vehicle icon of the host vehicle on the display device 3. This judgment is made for example based on the distance between the center coordinates of the vehicle icon of the following vehicle and the center coordinates of the vehicle icon of the host vehicle, etc.

If at step S203 it is judged that the vehicle icon of the following vehicle is superposed over the vehicle icon of the host vehicle, the present control routine proceeds to step S204. At step S204, the display control part 55 blanks out the display of the vehicle icon of the following vehicle. After step S204, the present control routine is ended.

On the other hand, if at step S203 it is judged that the vehicle icon of the following vehicle is not superposed over the vehicle icon of the host vehicle, the present control routine proceeds to step S205. At step S205, the display control part 55 displays the vehicle icon of the following vehicle on the display device 3. After step S205, the present control routine is ended.

Note that, at step S204, the display control part 55 may display the vehicle icon of the following vehicle transparently. Further, at step S204, the display control part 55 may blank out the display of or display transparently a part of the vehicle icon of the following vehicle. In this case, for example, the display control part 55 blanks out the display of or displays transparently the part of the vehicle icon of the following vehicle among the vehicle icons of the following vehicle superposed over the vehicle icon of the host vehicle.

Above, preferred embodiments according to the present disclosure were explained, but the present disclosure is not limited to these embodiments. Various corrections and changes may be made within the language of the claims. For example, the vehicle display system 1 may be mounted in a manually driven vehicle (a vehicle where autonomous driving is not possible) so as to provide information on other vehicles and assist the driving by the driver.

Further, the display device 3 of the vehicle display system 1 may be provided at, in addition to the vehicle 10 or instead of the vehicle 10, a server outside the vehicle 10 for an operator to remotely monitor the autonomous driving of the vehicle 10. In this case, the outputs of the vehicle detection device 2 and vehicle speed detection device 4 are sent from the vehicle 10 to the server, and the processor of the server may function as a display control part. Further, such a server may be provided with a steering device etc., for remote operation of the vehicle 10 by the operator.

Further, as the vehicle icon showing other vehicles, a plurality of types of vehicle icons may be used. For example, another vehicle detected by the vehicle detection device 2 may be identified as a passenger car or a truck and a vehicle icon of a passenger car and a vehicle icon of a truck may be used as the vehicle icon showing other vehicles.

REFERENCE SIGNS LIST

1 vehicle display system
2 vehicle detection device
3 display device
4 vehicle speed detection device
5 electronic control unit (ECU)
10 vehicle
12 other vehicle
12*a* following vehicle
55 display control part

The invention claimed is:

1. A vehicle display system comprising:
    a vehicle detection device detecting at least one other vehicle present in surroundings of a host vehicle;
    a display device displaying the host vehicle and the at least one other vehicle respectively as vehicle icons; and
    a processor configured to control a content of display of the display device, wherein
    the processor is configured to hide or display transparently at least a part of a vehicle icon of a vehicle detected by the vehicle detection device, when the at least a part of the vehicle icon of the vehicle detected by the vehicle detection device is superposed over the vehicle icon of the host vehicle.

2. The vehicle display system according to claim 1, wherein the processor is configured to hide or display transparently part of the vehicle icon superposed over the vehicle icon of the host vehicle, among the vehicle icon of the vehicle detected by the vehicle detection device.

3. The vehicle display system according to claim 1, wherein when a speed of the host vehicle is equal to or less than a predetermined value, the processor is configured to hide or display transparently the at least a part of the vehicle icon of the vehicle detected by the vehicle detection device.

4. The vehicle display system according to claim 1, wherein the processor is configured to hide or display transparently the at least a part of the vehicle icon of the vehicle detected by the vehicle detection device and positioned at a rear of the host vehicle in a driving lane of the host vehicle.

5. A vehicle display method for displaying a host vehicle and at least one other vehicle present in surroundings of the host vehicle respectively as vehicle icons on a display device, including:
    detecting the at least one other vehicle by a vehicle detection device; and
    hiding or displaying transparently at least a part of a vehicle icon of a vehicle detected by the vehicle detection device, when the at least a part of the vehicle icon of the vehicle detected by the vehicle detection device is superposed over the vehicle icon of the host vehicle.

6. The vehicle display method according to claim 5, wherein the vehicle display method includes: hiding or displaying transparently part of the vehicle icon superposed over the vehicle icon of the host vehicle, among the vehicle icon of the vehicle detected by the vehicle detection device.

7. The vehicle display method according to claim 5, wherein the vehicle display method includes: when a speed of the host vehicle is equal to or less than a predetermined value, hiding or displaying transparently the at least a part of the vehicle icon of the vehicle detected by the vehicle detection device.

8. The vehicle display method according to claim 5, wherein the vehicle display method includes: hiding or displaying transparently the at least a part of the vehicle icon of the vehicle detected by the vehicle detection device and positioned at a rear of the host vehicle in a driving lane of the host vehicle.

* * * * *